Figure 1:
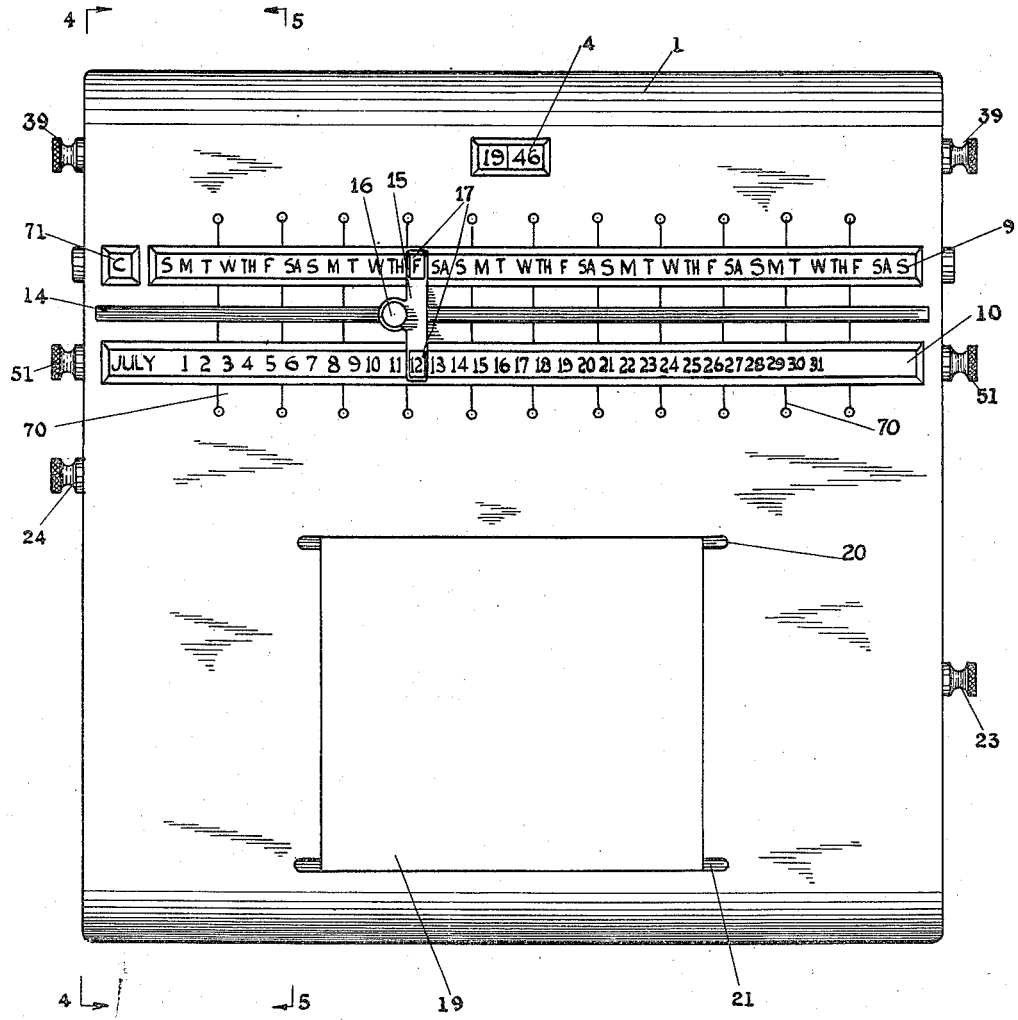

March 6, 1951　　　J. FLANAGAN　　　2,544,148
PERPETUAL CALENDAR

Filed Dec. 12, 1946　　　　　　　　　　　　5 Sheets-Sheet 2

INVENTOR:
JOHN FLANAGAN
by Richardson and David
ATTYS

March 6, 1951     J. FLANAGAN     2,544,148

PERPETUAL CALENDAR

Filed Dec. 12, 1946     5 Sheets-Sheet 3

INVENTOR
JOHN FLANAGAN

BY Otto Munk
HIS ATTY

Figures 6, 7, 8:
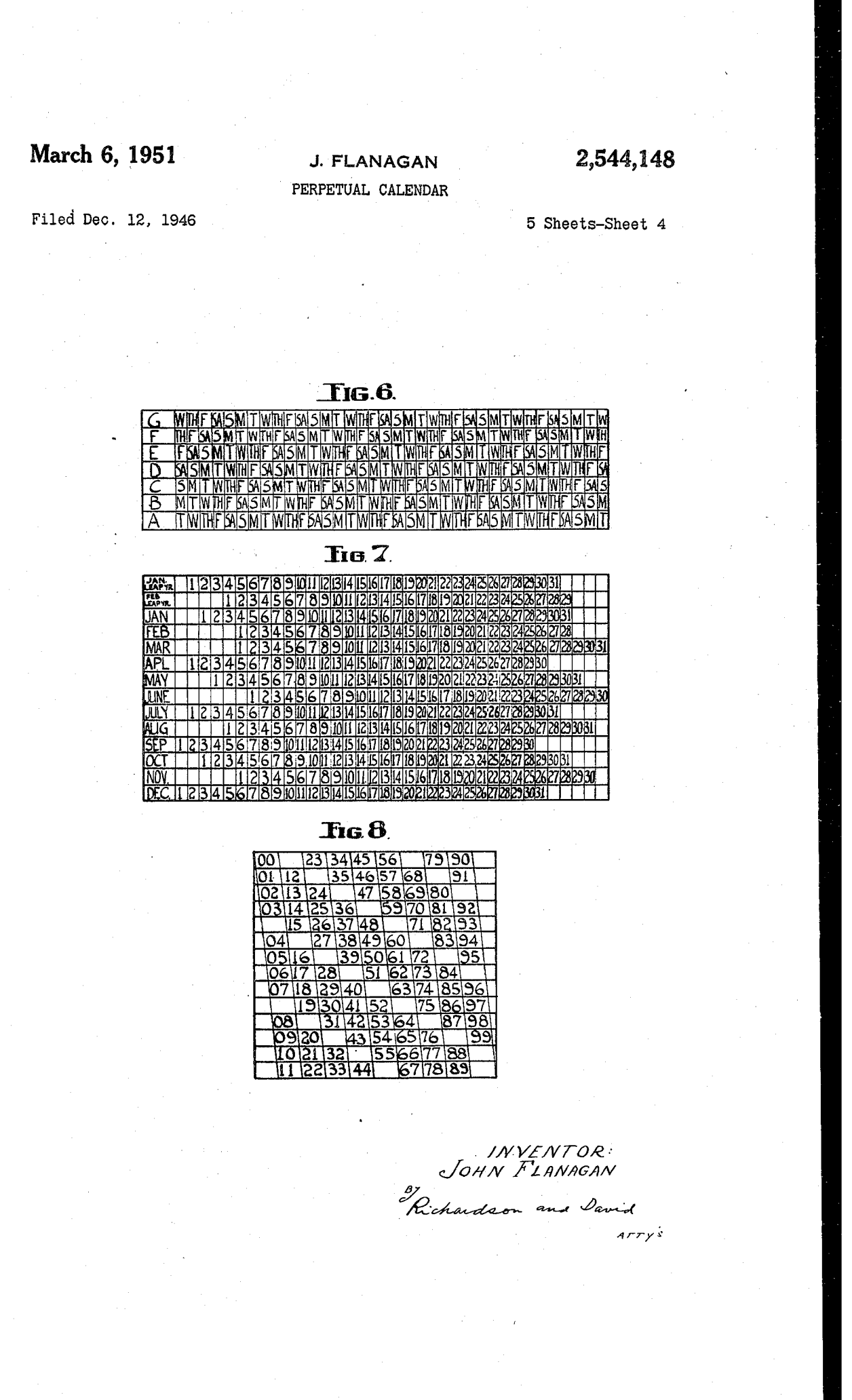

March 6, 1951         J. FLANAGAN         2,544,148

PERPETUAL CALENDAR

Filed Dec. 12, 1946         5 Sheets-Sheet 4

INVENTOR:
JOHN FLANAGAN
By Richardson and David
Att'ys

March 6, 1951　　　　　J. FLANAGAN　　　　　2,544,148
PERPETUAL CALENDAR
Filed Dec. 12, 1946　　　　　　　　　　　　　5 Sheets-Sheet 5

Fig. 9.

|   | A |   |   |   |   |   |
|---|---|---|---|---|---|---|
| 0 | 1 | 2 | 3 | 4 | 5 | 6 |
| 7 | 8 | 9 | 10| 11| 12| 13|
| 14| 15| 16| 17|   |   |   |
|   |   |   | 18|   | 19| 20|
| 21|   | 22|   |   | 23| 24|
| 25|   | 26|   |   | 27| 28|
| 29|   | 30|   |   | 31| 32|

B / C

| 04 | 10 |    | 21 | 27 | 32 | 38 |    | 49 | 55 | 60 | 66 |    | 77 | 83 | 88 | 94 | B | C | D | E | F | G | A |
|    | 05 | 11 | 16 | 22 |    | 33 | 39 | 44 | 50 |    | 61 | 67 | 72 | 78 |    | 89 | 95 | A | B | C | D | E | F | G |
| 00 | 06 |    | 17 | 23 | 28 | 34 |    | 45 | 51 | 56 | 62 |    | 73 | 79 | 84 | 90 |    | G | A | B | C | D | E | F |
| 01 | 07 | 12 | 18 |    | 29 | 35 | 40 | 46 |    | 57 | 63 | 68 | 74 |    | 85 | 91 | 96 | F | G | A | B | C | D | E |
| 02 |    | 13 | 19 | 24 | 30 |    | 41 | 47 | 52 | 58 |    | 69 | 75 | 80 | 86 |    | 97 | E | F | G | A | B | C | D |
| 03 | 08 | 14 |    | 25 | 31 | 36 | 42 |    | 53 | 59 | 64 | 70 |    | 81 | 87 | 92 | 98 | D | E | F | G | A | B | C |
|    | 09 | 15 | 20 | 26 |    | 37 | 43 | 48 | 54 |    | 65 | 71 | 76 | 82 |    | 93 | 99 | C | D | E | F | G | A | B |

INVENTOR
JOHN FLANAGAN
BY *Otto Munk*
HIS ATTY

Patented Mar. 6, 1951

2,544,148

UNITED STATES PATENT OFFICE 2,544,148

PERPETUAL CALENDAR

John Flanagan, Maylands, South Australia, Australia, assignor to Twentieth Century Inventions Limited, Adelaide, South Australia, Australia, a corporation of South Australia Application December 12, 1946, Serial No. 715,865
In Australia January 21, 1946

4 Claims. (Cl. 40—111)

1

This invention relates to an improved perpetual calendar and in particular to the adaption of it to use as a desk calendar. It may be utilised however for the calculations of dates, months and days for various centuries.

Previously, perpetual calendars or date indicators have been in the form of cross reference tables, or card devices, or complicated mechanisms indicating years, months and days. This invention consists of very simple means of indicating the day and date from a setting of the year and month.

According to this invention as at present constructed and adapted to a desk calendar the mechanism is placed in a suitable casing specially shaped so that its face can be easily seen when it is placed on a table or desk. The indicating means are shown by three indicators, one for years, one for days and the other showing the month and date.

The year indicator can be operated by hand and rotates in bearings mounted in the casing, and it is in the form of a rotatable drum having series of indicating faces. Rotation of the year indicator causes it to move axially by means of a helical guide upon its periphery so that a particular year may be set to be indicated through an aperture in the face of the calendar. The day indicator is in the form of a series of faces on the surface of a rotary drum and is mounted in bearings in the casing and is suitably geared to the year indicator so that when the year indicator is altered a new series of days will be indicated through an aperture in the casing. One of the faces of the day indicator is visible at one time and shows all the days of one month.

The month and date indicator consists of a rotary drum mounted in bearings upon the casing and having a series of faces upon each of which are marked each month and the number of dates in that month, two extra faces being provided having a January and February for leap year marked upon them and the corresponding dates. The month and date indicator can be rotated in its bearings and set to the appropriate month by hand and has no gearing to the year and day indicator and is visible through an aperture in the casing so that a month and all the dates in that month are visible for one setting.

The day and month and date indicators are so visible on the face of the casing that a moving cursor on the face will show the day of the week for its particular date on the month date indicator. This cursor can be moved in a groove on the face of the casing between the day indicator and month date indicator.

2

In order however that the invention may be more clearly understood it will now be described with reference to the accompanying drawings in which—

Figure 2:
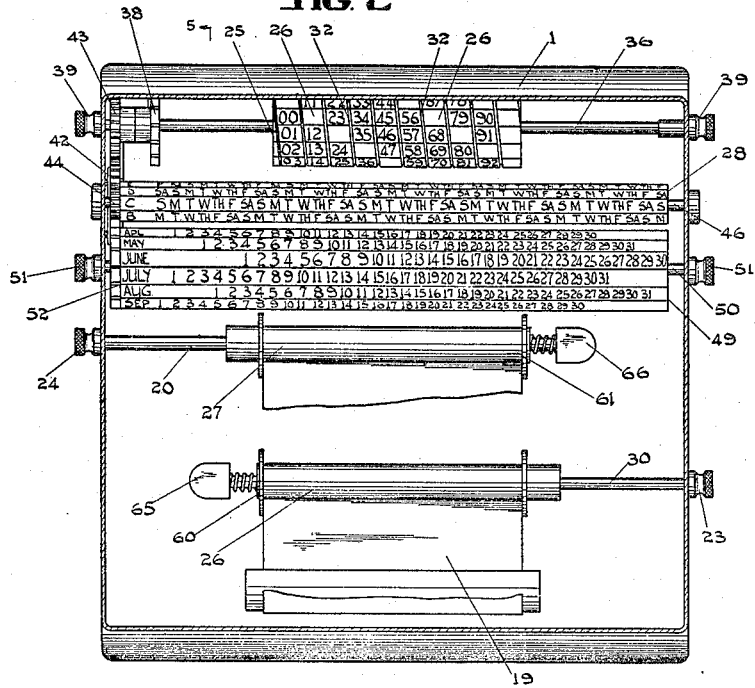
Figure 3:
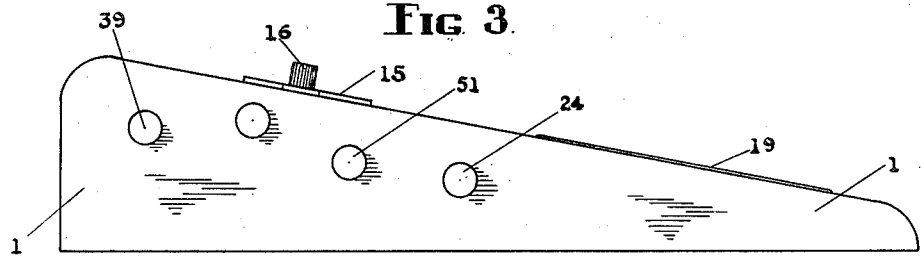
Figure 4:
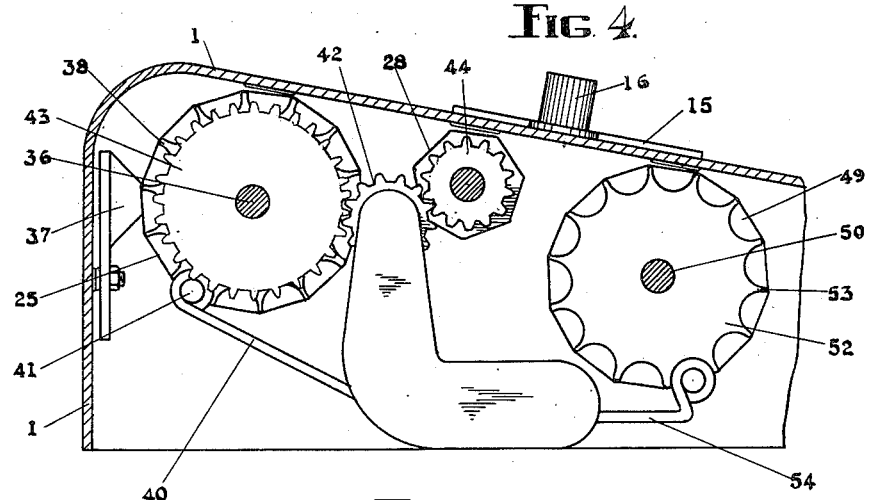
Figure 5:
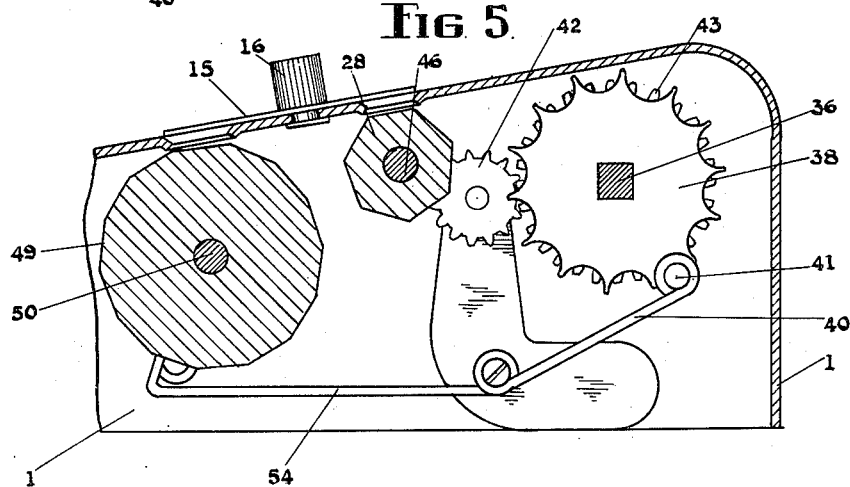

Fig. 1 is a plan view showing the face of the calendar through which are visible the indicators, Fig. 2 is a plan view of the calendar with the front plate removed to show the operation of the indicators, Fig. 3 is an end view of Fig. 1, Fig. 4 is a part view in section on line 4—4 of Fig. 1, Fig. 5 is a part view in section on line 5—5 of Fig. 2, Fig. 6 is a diagrammatic view showing the method of arranging the day indicator in which each transverse column represents a face of the rotary drum forming the day indicator, Fig. 7 is a diagrammatic view of the method of setting out the months and dates in which the transverse columns represent the faces of the rotary drum forming the month and date indicator, Fig. 8 is a diagrammatic view showing the year indicator in which the inclined lines show diagrammatically each turn of the helical guide and the transverse columns of the indicating faces of the drum, and Fig. 9 is a diagrammatic view of a table which is used in conjunction with the calendar.

The casing or upper frame 1 of the calendar is shaped and suitably adapted so that it may be placed upon a desk the upper face carrying the indicators, and the appointment pad or note pad 19. The casing is arranged so that it can be easily seen when the calendar is used upon a desk or the like. The upper face of the casing has an aperture 4 through which the required year of a century is visible, the actual century being indicated adjacent to said aperture on the casing so that when the calendar is operated the year of the century may be altered through the said aperture. The day indicator and the month date indicator have apertures 9 and 10 respectively in the casing of the calendar so that a series of days will be visible through the aperture 9 and a month of dates through the aperture 10. Between the day indicator, and the month date indicator, is a guide 14 in which may be operated a cursor 15 the said cursor 15 having slots 17 through which the day and date are visible so that the cursor by means of the knob 16 may be set at any required date to indicate the corresponding day or alternately it may be set on a day to indicate the corresponding date. Further apertures 20 and 21 are provided in the casing 1 so that an appointment pad or note pad 19 may be provided, the said pad being in the form of a movable strip of paper which can be moved by means of the knobs 23 or 24 so that the paper may be movable as required through the apertures 20 and 21.

The year indicator is in the form of a rotary drum 25 having faces 26 indicating years of a century and having a helical guide 32 carried upon the periphery of the rotary drum 25. The year indicating drum 25 is carried upon a square shaft 36 so that it is slidable axially upon said shaft 36, the said axial movement along the shaft 36 being obtained by the rotation of the shaft 36 in the bearings in the casing, and the action of a member 37 secured to the frame of the calendar and adapted to co-operate with the helical guide 32 of the year indicator drum. The shaft 36 may be rotated by turning knobs 39 and the axial movement provided by the helical guide 32 and the member 37 serves to always position a face 26 so that it is visible through the year aperture 4 and the particular year of a century will be placed adjacent the century marking on the casing of the calendar. Secured to the shaft 36 is a positioning member 38 which is adapted to co-act with a spring member 40 having a pawl 41 which operates with the teeth of the positioning member 38 so that the figures on the indicating face of the year indicator may be set exactly opposite the aperture 4 in the casing by rotation of the knob 39. The pawl 41 may be operated against the spring 40 into a further position on the face of said year indicator. The year indicator has fourteen indicating faces and the layout of said year indicator is shown diagrammatically in Fig. 8, the inclined lines showing the turns of the helical guide and the longitudinal columns showing each of the fourteen indicating faces of the year indicator.

The day indicator is in the form of a rotary drum 28 which is carried upon a shaft 46 having bearings in the casing of the calendar and is operated by means of a toothed wheel 44 which is geared through an idler 42 to a toothed wheel 43 carried upon the shaft 36 of the year indicator. The day indicator has seven indicating faces and is geared to the shaft 36 so that one turn of the year indicator corresponds to two turns of the day indicator. It will be seen that by operating the year indicator so that the years of the century are changed from one indicating face on the year indicator to the next this will automatically change the set of days on the day indicator from one indicating face to the next. Fig. 6 shows the diagrammatic layout of the drum for the day indicator in which A B C D E F and G indicate the transverse columns of the seven indicating faces one of which will be visible through the casing at any setting.

The month and date indicator is in the form of a rotary drum 49 carried upon a shaft 50 carried in bearings in the casing and is operated by means of turning knobs 51 and has a series of indicating faces. The month and date indicator has no gearing to the other indicators and may be set to any one of the required months as set out diagrammatically in Fig. 7, the transverse columns corresponding to the dates of the month as indicated. The month date drum has fourteen indicating faces being the twelve months of the year and two additional faces for January and February of leap year. Secured to the shaft 50 is a positioning member 52 having teeth 53 which co-act with a spring 54 to set any one required month date face exactly within the aperture 10 in the casing 1.

The day indicator and the month date indicator show at any one time a number of days in a month and also the date in that particular month. The corresponding day to a date of a month may be seen on the calendar by operation of the cursor 15 which automatically shows the correct reading, and also the face of the calendar may be adapted to have parallel lines 70 drawn upon the face to assist in reading the correct day for a corresponding month when the cursor is not operated so that by glancing at the calendar the date may be obtained for any particular day and vice versa.

The operation of this device utilised as a normal type of calendar is as follows:

Referring to Fig. 1 it will be seen that the year of 1946 is indicated which shows that the 12th of July is a Friday. To obtain this setting on the calendar the knob 39 of the year indicator is rotated until such time as the year 46 of the century is seen through the aperture 4 in the casing. The actual century is indicated by a figure 19 adjacent to the year aperture 4. The setting of the year of the century in the year aperture automatically operates the day indicator by means of the tooth wheels 43 and 44 so that the correct days will be indicated in the day aperture 9. The required month in this case July is now set by operating the turning knob 51 so that the month date indicator is rotated until the month of July is visible through the aperture 10 in the casing. The cursor 15 may now be operated by means of the knob 16 so that any day corresponding to a date on a month date indicator may be shown or alternately the days opposite the dates may be seen by means of the parallel lines 70 on the surface of the casing.

The calendar may be operated to find the correct day for a date in any year of any century and this is obtained by means of a table which can be normally carried upon the casing of the calendar or it may be carried on a separate indicating sheet. The above mentioned table is illustrated in Fig. 9 and shows three sections with indexes A, B and C the table being so set out that the section with the index "A" indicates the actual century, the index "B" indicates the years of the century and the index "C" gives a letter between A and G of the alphabet which can be set upon the calendar. The letters of the alphabet from A to G are set out on the indicating surfaces of the day indicator and are shown in Fig. 6. The beforementioned letters are visible through an aperture 71 in the face of the indicator and the required letter may be set in said aperture 71 by rotating the year indicator knob 39. To obtain the day corresponding to any date of a year, reference is made to the table illustrated in Fig. 9 and the reference letter is obtained. Said reference letter is set upon the face of the indicator by operation of the knob 39 so that it will be visible through the aperture 71 and in this case the correct century will not be shown in the year indicating aperture. The month date indicator is now set by operation of the turning knob 51 and the day corresponding to the date of the month is then obtained by movement of the cursor 15. The table illustrated in Fig. 9 is for use with the perpetual calendar but the following list gives the dates which are exceptions to this table and sets out the corresponding reference letters which must be set upon the calendar to obtain the day for a date in these years.

| | | | |
|---|---|---|---|
| 1752—E | 1764—D | 1776—C | 1788—B |
| 1753—D | 1765—C | 1777—B | 1789—A |
| 1754—C | 1766—B | 1778—A | 1790—G |
| 1755—B | 1767—A | 1779—G | 1791—F |
| 1756—G | 1768—F | 1780—E | 1792—D |
| 1757—F | 1769—E | 1781—D | 1793—C |
| 1758—E | 1770—D | 1782—C | 1794—B |
| 1759—D | 1771—C | 1783—B | 1795—A |
| 1760—B | 1772—A | 1784—G | 1796—F |
| 1761—A | 1773—G | 1785—F | 1797—E |
| 1762—G | 1774—F | 1786—E | 1798—D |
| 1763—F | 1775—E | 1787—D | 1799—C |

As an example of the use of the table illustrated in Fig. 9 take June 18, 1815 in which 18 is found in "A," 15 is found in "B" and following these across to "C" the letter indicated is E. By setting E within the aperture 71 by rotation of the knob 39 it will be found that the 18th June is a Sunday. The calendar may be used from the first to the fifty-second centuries.

What I claim is:

1. An improved calendar characterised by a casing, a year indicator, a shaft carried by said casing supporting said indicator to be movable axially on said shaft but not rotational thereon, a helical guide on said indicator, means on the casing co-operating with the helical guide to move the indicator axially when the supporting shaft of same is rotated, a rotatable day indicator carried upon a shaft in said casing, a rotatable month date indicator carried upon a shaft in said casing, means to simultaneously rotate the year and day indicator, and means to set the month date indicator.

2. An improved calendar characterised by a casing, a year indicator carried by the casing and bearing numerals indicating each year of a century, a day indicator also carried by the casing and having rows of letters indicating successive days of any month, a month date indicator also carried by the casing and having rows indicating the months and the dates thereof, means to set said month date indicator to any month, and means coupling said day indicator to said year indicator to set said coupled indicators simultaneously.

3. An improved calendar characterised by a casing, a year indicator bearing numerals indicating each year of a century, a shaft carried by said casing supporting said indicator to be movable axially on said shaft but not rotational thereon, a helical guide on said indicator, means on the casing co-operating with the helical guide to move the indicator axially when the supporting shaft of same is rotated, a day indicator also carried by the casing and having rows of letters indicating successive days of any month, a month date indicator also carried by the casing and having rows indicating the months and the dates thereof, means to set said month date indicator to any month, and means coupling said day indicator to said year indicator to set said coupled indicator simultaneously.

4. An improved calendar characterised by a casing, a shaft carried in said casing, a year indicating drum having fourteen faces on its periphery and being rotatable with said shaft, a helical groove on the periphery of said drum, a helical indicating face on said drum bearing numerals indicating years of a century, means on said casing to co-act with said helical groove to move the drum axially when the said shaft is rotated, a day indicating drum having seven indicating faces on its periphery, gearing between said year indicating drum and said day indicating drum to rotate the year indicating drum at half the number of revolutions of the day indicating drum, an aperture in the casing to display one face of the day indicating drum, a month date indicating drum parallel and adjacent to the day indicator drum and having fourteen indicating faces upon each of which is displayed a month of a year and the corresponding dates and including the months and dates of January and February of leap year, means to set said month date indicating drum, so that for any setting of the year indication the correct days will be set against the corresponding dates for any month.

JOHN FLANAGAN.

REFERENCES CITED

The following references are of record in the file of this patent:

UNITED STATES PATENTS

| Number | Name | Date |
|---|---|---|
| 641,433 | Buell | Jan. 16, 1900 |
| 1,370,220 | Miller | Mar. 1, 1921 |
| 1,541,102 | Bowman | June 9, 1925 |
| 1,670,316 | Schlusing | May 22, 1928 |
| 1,692,199 | Bowman | Nov. 20, 1928 |
| 2,343,969 | Forbes | Mar. 14, 1944 |
| 2,400,268 | Skene | May 14, 1946 |
| 2,470,692 | Farr | May 17, 1949 |

FOREIGN PATENTS

| Number | Country | Date |
|---|---|---|
| 489,164 | France | Dec. 28, 1918 |
| 566,722 | France | Feb. 9, 1924 |
| 833,919 | France | Nov. 4, 1938 |